(12) United States Patent
Delker et al.

(10) Patent No.: US 7,822,391 B1
(45) Date of Patent: Oct. 26, 2010

(54) MOBILE STATION EMERGENCY BEACON SYSTEM

(75) Inventors: Jason R. Delker, Olathe, KS (US); John Everson, Kansas City, MO (US); Jeffrey Mau, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 11/171,164

(22) Filed: Jun. 30, 2005

(51) Int. Cl.
*H04B 1/38* (2006.01)

(52) U.S. Cl. ............... 455/90.1; 455/404.1; 455/550.1; 340/539.11; 340/539.12; 340/539.13; 340/539.15; 340/531; 379/37; 379/38; 379/40

(58) Field of Classification Search ............. 455/404.1, 455/404.2, 550.1; 340/309.15, 531, 539, 340/568.1, 573.1, 309.16, 539.1; 342/357.07, 342/386; 379/40–41
See application file for complete search history.

(56) References Cited

U.S. PATENT DOCUMENTS

| | | | |
|---|---|---|---|
| 4,394,777 A * | 7/1983 | Wren | .......................... 455/95 |
| 4,878,236 A | 10/1989 | Ray | |
| 4,931,780 A | 6/1990 | LaMont | |
| 4,935,951 A | 6/1990 | Robinson | |
| 4,993,058 A | 2/1991 | McMinn | |
| 5,012,507 A | 4/1991 | Leighton | |
| 5,479,482 A | 12/1995 | Grimes | |
| 5,497,149 A * | 3/1996 | Fast | ........................... 340/988 |
| 5,555,286 A | 9/1996 | Tendler | |
| 5,748,084 A * | 5/1998 | Isikoff | ...................... 340/568.1 |
| 5,748,706 A | 5/1998 | Morgan | |
| 5,880,672 A | 3/1999 | Weaver | |
| 5,960,337 A * | 9/1999 | Brewster et al. | ......... 455/404.2 |
| 6,038,438 A | 3/2000 | Beeson | |
| 6,073,005 A | 6/2000 | Raith | |
| 6,314,281 B1 | 11/2001 | Chao | |
| 7,149,533 B2 * | 12/2006 | Laird et al. | ............... 455/456.3 |
| 7,355,507 B2 * | 4/2008 | Binning | ....................... 340/332 |
| 2001/0026240 A1 * | 10/2001 | Neher | .................... 342/357.07 |
| 2002/0158776 A1 * | 10/2002 | Lash et al. | .................... 340/984 |
| 2003/0032448 A1 * | 2/2003 | Bulthuis et al. | .............. 455/556 |
| 2003/0034881 A1 * | 2/2003 | Linnett et al. | ........... 340/309.15 |
| 2004/0242191 A1 * | 12/2004 | Hossain et al. | ............ 455/404.1 |
| 2005/0085257 A1 * | 4/2005 | Laird et al. | ............... 455/550.1 |
| 2006/0125626 A1 * | 6/2006 | Govindaraj | .................. 340/531 |

* cited by examiner

*Primary Examiner*—Dwayne D Bost
*Assistant Examiner*—Inder P Mehra

(57) ABSTRACT

A mobile telephone is provided with an emergency beacon. When the telephone's user dials an emergency number, such as 9-1-1, the telephone detects that an emergency number has been dialed, and it activates the beacon. The beacon may be a radio beacon, and, if the telephone is GPS-equipped, the radio beacon may send out the mobile telephone's location. Safety personnel can locate the caller by following the beacon to the caller. Other optional features include an audio emergency beacon and/or a visual emergency beacon, such as a strobe, in addition to or in place of a radio beacon. In one embodiment, the beacon is not activated unless the mobile telephone is unable to complete the call to the emergency number. In another embodiment, the beacon is activated without receiving any remote authorization from, for example, a 9-1-1 call center.

18 Claims, 3 Drawing Sheets

MOBILE STATION EMERGENCY BEACON SYSTEM

BACKGROUND

The 9-1-1 emergency telephone service makes it simple for an individual to call for help for any kind of emergency. When such a call is placed from a land-line telephone, a 9-1-1 call center can easily determine the caller's location. When a call is placed from a mobile telephone, however, it can be much more difficult to determine the caller's location. Several systems have been implemented or proposed to overcome this difficulty, including the Enhanced 9-1-1 service ordered by the Federal Communication Commission. Other such systems are described in U.S. Pat. Nos. 6,038,438 (Beeson et al.) and 6,314,218 (Chao et al.).

These systems, however, are not fully operative when a call to 9-1-1 fails to connect. As a result, a user's level of safety is diminished when his wireless telephone is out of range. This can make it more difficult for a user to seek help in circumstances where help is needed most—while hiking through a wooded area, or driving along a remote highway, for example.

Safety beacons have been developed that do not rely on the telephone system at all, such as the EPIRB (emergency position-indicating rescue beacon). When it is activated, an EPIRB broadcasts a 406 MHz beacon that is picked up by a satellite. Some EPIRB devices include a GPS (global positioning system) receiver that allows the EPIRB beacon to broadcast its precise location as determined by the GPS receiver. Some EPIRB devices can be carried by an individual and are referred to as PLBs (personal locator beacons). While EPIRB devices have the advantage of near-global coverage, they are intended to be activated only as a last resort, because they can trigger an intense international air-and-sea rescue effort. Moreover, they are typically carried only when a user foresees the possibility of finding himself in peril, as when embarking on an isolated journey over water or through the wilderness. As a result, they are rarely at hand during a more unexpected emergency, such as an accident on a remote stretch of highway.

SUMMARY

A mobile telephone is provided with an emergency beacon. When the telephone's user dials an emergency number, such as 911, the telephone detects that an emergency number has been dialed, and it activates the beacon. The beacon may be a radio beacon, and, if the telephone is GPS-equipped, the radio beacon may send out the mobile telephone's location. Safety personnel can locate the caller by following the beacon to the caller. Other optional features include an audio emergency beacon and/or a visual emergency beacon, such as a strobe, in addition to or in place of a radio beacon.

In one embodiment, the beacon is not activated unless the mobile telephone is unable to complete the call to the emergency number.

In another embodiment, the beacon is activated without receiving any remote authorization from, for example, a 911 call center.

DETAILED DESCRIPTION

Figure 1:
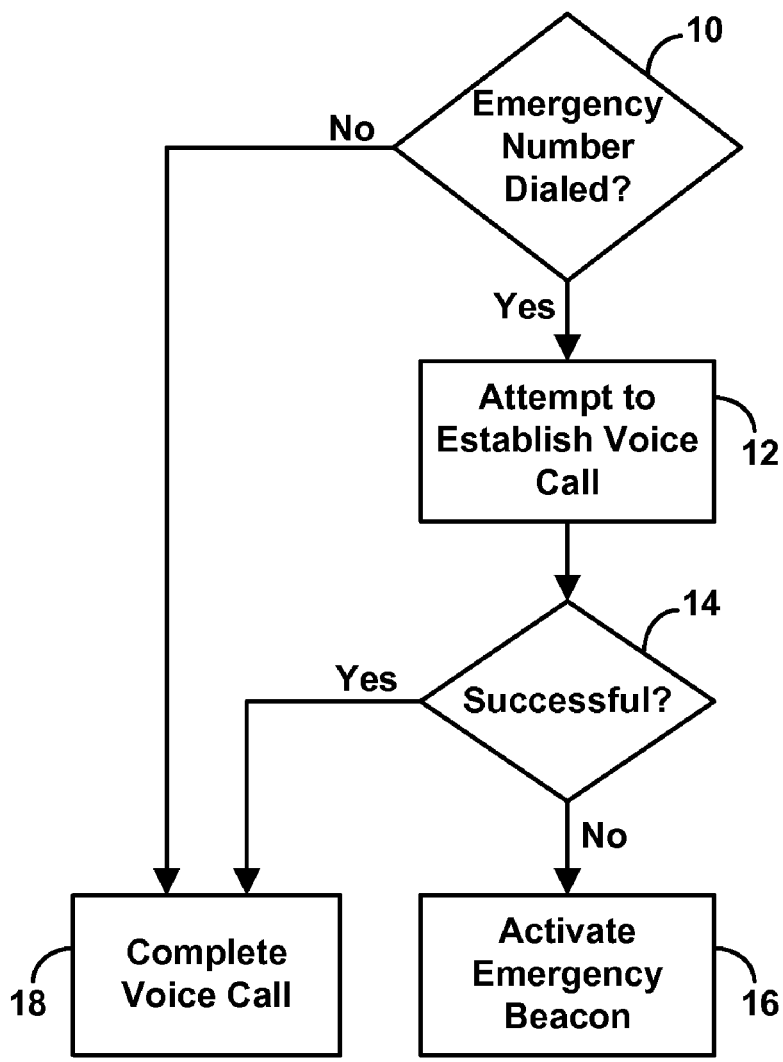
FIG. 1 is a schematic flow diagram of one emergency beacon method.

An emergency beacon method is illustrated in FIG. 1. At a user's mobile device, such as a mobile telephone, the user attempts to initiate a voice telephone call, and step 10, the mobile device determines whether that call is an emergency call. The mobile device may determine whether the call is an emergency call by, for example, comparing the digits dialed by the user to a list of emergency numbers, which may include 9-1-1 and/or telephone numbers for safety personnel such as police, fire, highway patrol, or the Coast Guard. One system for detecting whether a caller has dialed 9-1-1 is disclosed in U.S. Pat. No. 4,878,236 (Ray et al.). In an embodiment in which the user's mobile device is programmed to initiate an emergency telephone call at the push of a button, with the selection of a menu option, or other pre-programmed dialing option, the mobile device recognizes an attempt to initiate an emergency call when such an option is selected.

In step 12, the mobile device attempts to establish the voice call with the emergency service. In step 14, the mobile device determines whether that attempt has successful. The mobile device may consider an attempt unsuccessful if, for example, the signal level of radio communications is insufficient to establish a voice call, if a voice call has not been completed within a predetermined amount of time, or if the mobile device receives a signal that the telephone line of the emergency service is busy, disconnected, or otherwise unavailable. In determining whether the attempt to initiate the call is successful, the mobile device can allow for one or more repeated attempts before determining that there has been a failure.

If the attempt to establish the voice call is successful, then the call can be completed in step 18. Where the call is a call to 9-1-1, the completion of the voice call can include the transmission of the caller's location according to Enhanced 9-1-1 service.

If the attempt to establish the voice call is not successful, then the emergency beacon is activated in step 16. The emergency beacon may be, for example, a radio beacon, an audio beacon (such as a siren), or a visual beacon (such as a strobe). Where the beacon is a radio beacon, it may broadcast at the 406 MHz frequency assigned to EPIRB devices, or in another frequency. In an embodiment in which the mobile device is provided with GPS functionality, the radio beacon signal may indicate the location of the device as determined by the GPS. The emergency beacon signal may include other information, such as identifying information (e.g., a serial number or telephone number) and/or information revealing the nature of the emergency.

In one embodiment, the emergency beacon may be accompanied by a silent distress signal, such as a pre-recorded text message. A number of alternative messages may be previously stored in the mobile device, so that the user can select the appropriate message for the emergency at hand.

Figure 2:
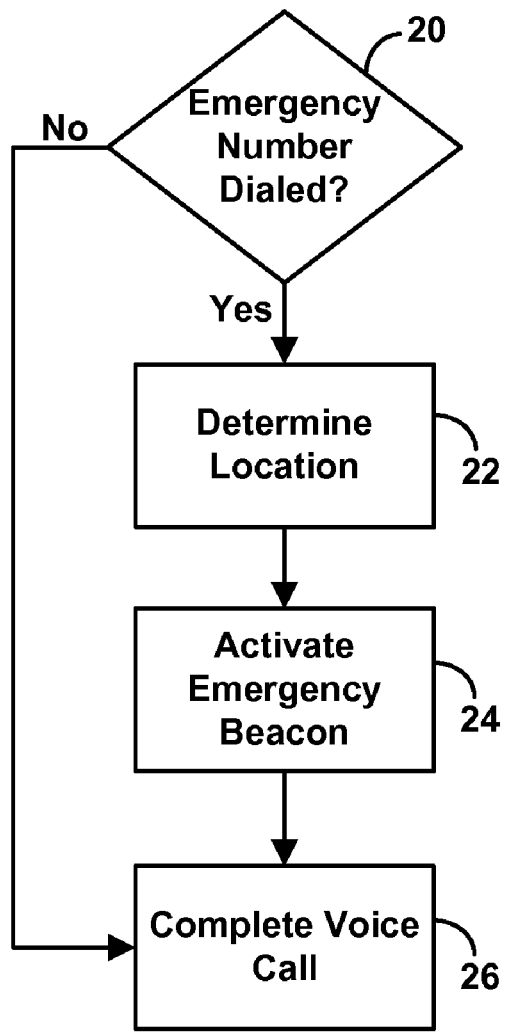
FIG. 2 is a schematic flow diagram of another emergency beacon method.

Another emergency beacon method is illustrated in FIG. 2. In step 20, a mobile device determines whether a user has initiated an emergency call. As described above, the device may do this by determining whether the user has dialed the telephone number of an emergency service. If the number dialed is not an emergency number, the mobile device completes the call as usual in step 26. If, however, the user has dialed an emergency number, then the mobile device determines its location in step 22. This determination may be made by, for example, GPS logic provided in the mobile device. In step 24, the mobile station activates the emergency beacon to broadcast the location of the mobile device. In step 26, the voice call to the emergency service is completed, if possible.

It should be noted that steps 20, 22, 24, and 26 need not be performed in the order illustrated, but may be performed in a different order. For example, if the user is employing the mobile device for navigation before making an emergency call, the device may already have determined its location (step 22). Conversely, the emergency beacon may be activated (step 24) as soon as an emergency number is dialed (step 20), while the location is determined (step 22) only later, and broadcast in the beacon if and when it becomes available.

Because the transmission of the emergency beacon is separate from the wireless voice connection (which may be a CDMA connection, for example), the emergency beacon is not dependent on a successful connection with an emergency call center. For example, the emergency beacon may be activated even if no connection has been made with the call center, and even if the call center is unable to provide any authorization or instruction to activate the emergency beacon. In one embodiment, the mobile device activates the emergency beacon without receiving authorization from any remote call center or other remote entity. The mobile device may or may not, however, require authorization from the device's user before activating the emergency beacon. Such user authorization, if implemented, can prevent the emergency beacon from being activated if the user dials 9-1-1 or other emergency number accidentally. Authorization may be obtained from the user by means of a cancel option, which warns the user that the beacon will be activated within a brief period of time if not canceled by the user. Alternatively, after the user dials 9-1-1, the mobile device may request an affirmative authorization before it activates the emergency beacon.

Figure 3:
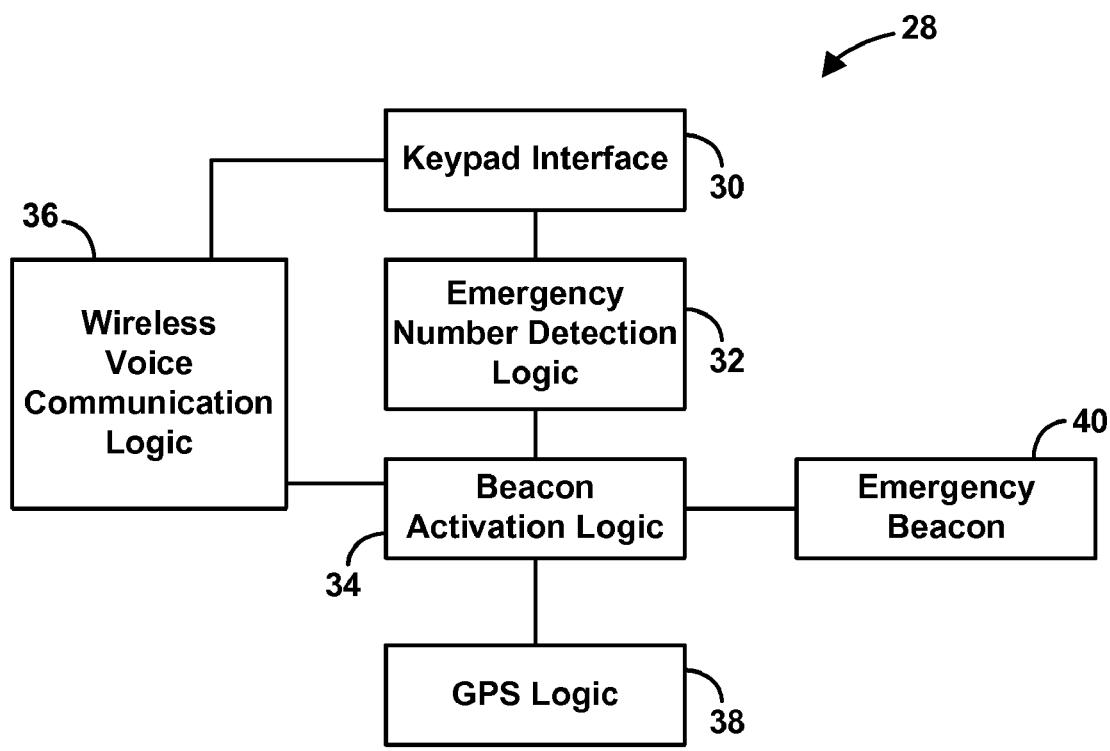
FIG. 3 is a schematic block diagram illustrating the functional architecture of a mobile telephone with an emergency beacon.

A mobile device 28 that includes an emergency beacon system is illustrated in FIG. 3. The mobile device includes conventional wireless voice communication logic 36 for carrying out telephonic voice communications over a wireless telecommunications system. A keypad interface 30 is also provided for dialing telephone numbers. The keypad interface may be a physical keypad, or it may be another type of dialing interface, such as an LCD (liquid crystal display) touch screen or speed-dial key or menu option.

Emergency number detection logic 32 is provided to determine when the user has dialed or selected the telephone number for an emergency service. The mobile device includes beacon activation logic 34. The beacon activation logic 34 is responsive to the emergency number detection logic, so that the dialing or selection of an emergency number causes the emergency number detection logic to activate an emergency beacon 40.

The emergency beacon 40 may include one or more of a 406 MHz EPIRB radio beacon, a radio beacon at a different frequency, an audio beacon (such as a siren), a visual beacon (such as a strobe) or other types of beacons.

In the embodiment illustrated in FIG. 3, the mobile device includes GPS logic 38. The GPS logic 38 determines the location of the mobile device. The implementation of a GPS receiver in a mobile telephone is described in U.S. Pat. No. 5,479,482 (Grimes). Under the direction of the beacon activation logic 34, the location determined by the GPS logic is provided to the emergency beacon 40 for broadcast in a radio signal.

In one embodiment, the beacon activation logic is in communication with the wireless voice communication logic 36 to determine whether the wireless voice communication logic has been successful in establishing voice communications with an emergency service. In such an embodiment, the beacon activation logic may activate the beacon only if the voice communication logic is unsuccessful in establishing a voice call. In a further feature of such an embodiment, the mobile device may send the GPS location of the device over the voice call (via an Enhanced 9-1-1 mechanism, for example) if a voice call is successful, and may activate the beacon to send the GPS location of the device only if the voice call was unsuccessful.

The invention is not limited to the several embodiments described in detail above, but rather is defined by the following claims.

The invention claimed is:

1. An emergency beacon method, comprising:
   at a mobile device at which a plurality of telephone numbers may be dialed, detecting that an emergency telephone number has been dialed;
   responsive to the dialing, the mobile device attempting to complete a voice call with an emergency call center at the dialed telephone number;
   the mobile device determining whether the attempt to complete the voice call was successful; and
   in response to a determination that the attempt to complete the voice call was not successful, the mobile device activating an emergency beacon of the mobile device, wherein the emergency beacon of the mobile device comprises at least one of an audio beacon and a visual beacon.

2. The method of claim 1, further comprising:
   in response to the determination that the attempt to complete the voice call was not successful, the mobile device activating a radio beacon of the mobile device in addition to activating the emergency beacon comprising at least one of the audio beacon and the visual beacon.

3. The method of claim 2, further comprising determining the location of the mobile device, and transmitting the location of the mobile device over the radio beacon.

4. The method of claim 3, wherein determining the location of the mobile device is done with GPS logic in the mobile device.

5. The method of claim 2, wherein the radio beacon transmits in the 406 MHz band.

6. The method of claim 1, wherein the emergency beacon comprises a visual beacon.

7. The method of claim 6, wherein the visual beacon comprises a strobe light.

8. The method of claim 1, wherein the emergency telephone number is 9-1-1.

9. An emergency beacon method, comprising:
   at a mobile device at which a plurality of telephone numbers may be dialed, detecting that an emergency telephone number has been dialed;
   in response to the detecting, the mobile device attempting to complete a voice call with an emergency call center at the dialed telephone number;
   the mobile device determining whether the attempt to complete the voice call was successful; and
   in response to a determination that the attempt to complete the voice call was not successful, the mobile device activating an emergency audio beacon of the mobile device.

10. The method of claim 9, wherein the audio beacon comprises a siren.

11. A mobile telephone at which a plurality of telephone numbers may be dialed, including:

a keypad input operative to receive a dialed telephone number;

emergency number detection logic operative to determine whether the dialed telephone number is an emergency telephone number;

an emergency beacon system operable to activate an emergency beacon of the mobile telephone, wherein the emergency beacon comprises at least one of an audio beacon and a visual beacon;

beacon activation logic operative to activate the emergency beacon of the mobile telephone in response to a determination that the dialed telephone number is an emergency telephone number, wherein the beacon activation logic is operative to activate the emergency beacon of the mobile telephone without remote authorization; and wireless voice communication logic operative to complete a wireless voice call at the dialed telephone number;

wherein the beacon activation logic is further operative to determine whether the wireless voice communication logic is successful in completing a wireless voice call to the emergency telephone number, and wherein the beacon activation logic is operative to activate the emergency beacon of the mobile telephone in response to determining that the wireless voice communication logic was not successful in completing the wireless voice call to the emergency telephone number.

12. The mobile telephone of claim 11, wherein the beacon activation logic is operative to activate a radio beacon of the mobile telephone in response to the determining that the wireless communication logic was not successful in completing the wireless call to the emergency telephone number, in addition to activating the emergency beacon of the mobile telephone in response to determining that the wireless voice communication logic was not successful in completing the wireless voice call to the emergency telephone number.

13. The mobile telephone of claim 12, wherein the radio beacon transmits in the 406 MHz band.

14. The mobile telephone of claim 11, wherein the emergency beacon comprises an audio beacon.

15. The mobile telephone of claim 14, wherein the audio beacon comprises a siren.

16. The mobile telephone of claim 11, wherein the emergency beacon comprises a visual beacon.

17. The mobile telephone of claim 16, wherein the visual beacon comprises a strobe light.

18. The mobile telephone of claim 11, wherein the emergency telephone number is 9-1-1.

* * * * *